United States Patent [19]

Sakai et al.

[11] 4,039,568
[45] Aug. 2, 1977

[54] PROCESS FOR DECOMPOSITION OF POLYURETHANE FOAM

[75] Inventors: Kazuyoshi Sakai, Kyoto; Shigeo Kobayashi, Ibaraki; Takeshi Fujita, Muko, all of Japan

[73] Assignee: Dai-Ichi Kogyo Seiyaku Co., Ltd., Kyoto, Japan

[21] Appl. No.: 613,584

[22] Filed: Sept. 15, 1975

[30] Foreign Application Priority Data

Sept. 14, 1974 Japan ..................... 49-106224
Oct. 11, 1974 Japan ..................... 49-117321
July 25, 1975 Japan ..................... 50-91315
Aug. 2, 1975 Japan ..................... 50-98260
Aug. 3, 1975 Japan ..................... 50-98917

[51] Int. Cl.² ................. C08J 27/00; C08J 85/00
[52] U.S. Cl. ................... 260/453 P; 260/2.3; 260/77.5 AP; 260/471 C; 260/475 P; 260/568; 260/621 M; 260/632 R
[58] Field of Search ............. 260/2.3, 453 P, 471 C, 260/475 P, 568, 665 R, 621 M, 632 R, 77.5

[56] References Cited

U.S. PATENT DOCUMENTS

| 2,937,151 | 5/1960 | Broeck et al. ............. 260/2.3 |
| 3,117,940 | 1/1964 | McElroy .................. 260/2.3 |
| 3,123,577 | 3/1964 | Heiss ..................... 260/2.3 |
| 3,300,417 | 1/1967 | McElroy .................. 260/2.3 |
| 3,404,103 | 10/1968 | Matsudaira et al. ........ 260/2.3 |
| 3,441,616 | 4/1969 | Pizzini et al. ............ 260/615 |
| 3,632,530 | 1/1972 | Kinoshita ................ 260/471 C X |
| 3,708,440 | 1/1973 | Frulla et al. ............. 260/2.3 |

FOREIGN PATENT DOCUMENTS

| 21,079 | 1968 | Japan |
| 5,280 | 1973 | Japan |
| 10,634 | 1967 | Japan |
| 20,069 | 1971 | Japan |
| 10,634 | 1967 | Japan |

*Primary Examiner*—Murray Tillman
*Assistant Examiner*—T. DeBenedictis, Sr.
*Attorney, Agent, or Firm*—Sughrue, Rothwell, Mion, Zinn and Macpeak

[57] ABSTRACT

A process for decomposing a polyurethane foam comprising heating the polyurethane foam at a temperature of about 50° to 180° C in the presence of an alcoholate alone, an alcoholate and an alkali hydroxide; or a combination of an alcoholate, or the alcoholate and alkali hydroxide and a decomposition accelerator, where the alcoholate is produced by alcoholating a part of the hydroxyl groups of an alcohol, or a part of the hydroxyl groups of an adduct of the alcohol or amine and an alkylene oxide, with an alkali metal, and the decomposition accelerator is selected from the group consisting of amines such as straight chain aliphatic amines, branched chain aliphatic amines, alicyclic amines, heterocyclic amines, and aromatic amines; those compounds produced by cyanoethylating the above amines or by partly adding an alkylene oxide to the above amines; and amines and urea based compounds, or in the presence of the alcoholate, decomposition accelerator, and an alkali hydroxide.

20 Claims, No Drawings

4,039,568

PROCESS FOR DECOMPOSITION OF POLYURETHANE FOAM

BACKGROUND OF THE INVENTION

1. Field of the Invention

The present invention relates to a process for the decomposition of polyurethane foams. More particularly, the present invention relates to a process for decomposing or dissolving rigid, semi-rigid or flexible polyurethane foams or elastomers by the use of an alcoholate alone, the alcoholate and and alkali hydroxide, or a combination of alcoholate or the alcoholate and an alkali hydroxide and a decomposition accelerator which enables one to treat the polyurethane foams or elastomers at lower temperatures as compared with conventional methods, and thus is favorably usable in the disposal and reclaimation of waste polyurethane foams and the like.

2. Description of the Prior Art

Remarkable developments in the size of the polyurethane industry has caused problems such as waste disposal and a shortage of starting materials. In particular, in the case of manufacturing slab stock foams, a great deal of scrap foam is by-produced which cannot be sold as goods. This scrap foam, therefore, is bonded for re-use or is used as a filler, but it cannot be satisfactorily used for other purposes because of its poor physical properties. Thus, waste disposal is a substantial problem with such materials.

As a method of disposing scrap foam of low value, a further decomposing of scrap foam to recover the starting materials has been developed. For example, Japanese Patent Publication No. 10634/1967 describes a method of converting a polyurethane foam into polyols and polyamines in which the isocyanate group of the polyisocyanate used in the production of the foam are converted into an amine. This reaction is carried out by heating the foam together with an amine or amines, and, after a two-phase separation occurs, the reaction products are separated by distillation or the like.

In Japanese Patent Publication Nos. 21079/1968 and 5280/1973, the foam is decomposed in a decomposition solution in which an amine compound is used in combination with an alkali metal hydroxide or the like, whereby after separation, e.g., by distillation, etc., a polyether is recovered.

Japanese Patent Publication No. 20069/1971 describes a decomposition method using a glycol containing about 2 to 6 carbon atoms. This method requires heating at a temperature of about 200° C, and the solution obtained by the decomposition is subjected to separation and distillation processings whereupon polyol is recovered.

Japanese Patent Application (OPI) 28407/1973 discloses a method of decomposing a rigid foam by heating at a temperature of about 175° to 250° C in the presence of glycol containing 2 to 6 carbon atoms and 0 to 10% by weight of a dialkanol amine. The decomposed solution is used as the recovered polyol as it is.

U.S. Pat. No. 3,117,940 describes a process for the obtaining of the starting materials for polyurethane from polyurethane scraps and primary amines. However, the products obtained are rich in the amino group, and are not suitable for use in foaming.

In U.S. Pat. No. 3,404,103, an amine decomposition reagent is used, and a decomposed mixture of polyol and polyamine (derived from the polyisocyanate) is obtained.

The prior art methods above require heating at high temperatures or special apparatus for distillation processing. Furthermore, problems occur in that the peroxides in the polyol increase and the use of starting materials containing such peroxides causes coloration and physical deterioration.

It has thus been desired to provide a method for removing the above defects of the prior art.

SUMMARY OF THE INVENTION

As a result of intensive investigations on the above problems, it has now been found that a polyurethane resin can be efficiently decomposed by heating at a temperature of about 50° to 180° C in the presence of an alcoholate alone, an alcoholate and an alkali hydroxide, or a combination of an alcoholate or an alcoholate and an alkali hydroxide, wherein the alcoholate is produced by alcoholating a part of the hydroxyl groups of an alcohol, or a part of the hydroxyl groups of an adduct of the alcohol or an amine and an alkylene oxide, with an alkali metal, and the decomposition accelerator is selected from the group consisting of amines such as straight chain aliphatic amines, branched chain aliphatic amines, alicyclic amines, heteroxyclic amines and aromatic amines; those compounds produced by cyanoethylating the above amines or by partly adding an alkylene oxide to the above amines; and amides and urea based compounds.

The present invention provides a method of decomposing a polyurethane foam by heating at a temperature of about 50° to 180° C in the presence of the above alcoholate, with or without a decomposition accelerator, and, if desired, an alkali hydroxide.

DETAILED DESCRIPTION OF THE INVENTION

The method of the present invention is usually carried out at atmospheric pressure. Since one object of this invention is to lower the decomposition temperature employed, reaction under pressure is not usually used. However, when using amines having a relatively low boiling temperature it is possible to conduct decomposition under pressure, for example at 2 - 3 atm., at a lower temperature than that employed in the conventional process.

The method of the present invention is carried out by the use of an alcoholate alone, an alcoholate and an alkali hydroxide, or a combination of an alcoholate, or an alcoholate and an alkali hydroxide with a decomposition accelerator, where the alcoholate is produced by alcoholating (i) an alcohol or the alkylene oxide adduct of the alcohol or an alkylene oxide adduct of an amine having an OH equivalent of about 30 to 1,000, preferably about 35 to 500, more preferably about 60 to 300, with an alkali metal or an alkali metal hydroxide in an amount of about 0.0001 to 0.5 mole, preferably about 0.001 to 0.25 mole, more preferably about 0.01 to 0.15 mole per OH equivalent of the material being alcoholated, the decomposition accelerator being selected from the group consisting of:

a. one or more straight chain aliphatic amines, branched chain aliphatic amines, alicyclic amines, heterocyclic amines or aromatic amines;

b. one or more compounds produced by cyanoethylating the above amines or by the partial addition of an alkylene oxide to the above amines as later described; and c. one or more amides or urea based compounds.

Suitable alcohols for use in preparing the alcoholates are monohydric alcohols such as methanol, ethanol, propanol, and the like; dihydric alcohols such as ethylene glycol and propylene glycol; trihydric alcohols such as glycerin and trimethylolpropane; and polyhydric alcohols such as pentaerythritol, diglycerin, sorbitol, α-methylglycoside, sugar, and the like; etc. Preferred materials are the di-, tri- or tetrahydric alcohols having 2 - 3 carbon atoms per (alcoholic) OH equivalent of alcohols, with this later value also applying to the alkylene oxide adduct of the alcohol or amine earlier described.

The alkylene oxide adducts of the alcohols or amines are those compounds produced by adding ethylene oxide, propylene oxide, butylene oxide, or the like, most preferably an alkylene oxide of 2 - 4 carbon atoms, as the alkylene oxide, alone or in admixture, to the above alcohol in the form of random or block copolymers, for example ethylene oxide - propylene oxide at a 20 - 80 : 80 - 20 weight ratio in the case of random copolymers or by addition-polymerizing the alkylene oxide to an aliphatic or aromatic amine in the same manner as described above e.g., in a closed vessel at 120°±10° C without a catalyst. The random or block copolymerizations are conducted under the same conditions except that the mixture of the starting materials (ethylene oxide and plopylene oxide) is added at the beginning with a block copolymerization, while in the case of a random copolymerization, these materials are added separately.

Suitable aliphatic amines are methylamine, ethylamine, ethylenediamine, diethylenetriamine, triethylenetetraamine, and the like; and suitable aromatic amines are aniline, toluene-diamine, and the like. Ethylenediamine, diethylenetridiamine, methaxylenediamine, methaphenylenediamine etc. are preferred.

Preferred copolymers are those of molecular weight of 50–5,000, preferably 100–3,000, most preferred are alkylene-oxide/alcohol adducts at a 1 : 1 - 50, preferably at 1 : 1 - 10, molar ratio and alkyleneoxide/amine adducts at a 1 : 1 - 50, preferably 1 : 1 - 10, molar ratio, which have a molecular weight of 100-400.

Alcoholates for use in the present invention are produced by adding potassium or sodium as the alkali metal onto the remaining OH groups of the above alcohol or alkylene oxide adduct, or by adding KOH or NaOH as the alkali hydroxide to the remaining OH groups of the above alcohol or alkylene oxide adduct and dehydrating the reaction system under reduced pressure e.g., at 3 mmHg, 130° C, 1 hr. The end point of the formation of the alcoholate is determined by measuring the water content flowing into a trap by comparing the water content measured with that theoretically obtained.

With regard to the ratio of the decomposition reagent to the polyurethane foam, it is possible for the decomposition reagent alcoholate per se, alcoholate + hydroxide, etc. to decomposed the polyurethane foam several times as much as 100 parts by weight of the decomposition reagent, with 1 part by weight of reagent to 1–10 parts by weight polyurethane, preferably 1 : 2–5 parts by weight, most generally being used on a commercial scale.

The rate of decomposition decreases as the decomposed amount increases, and it is desirable to use the alkali hydroxide in combination with the decomposition accelerator in order to prevent the viscosity of the decomposition solution from increasing.

The ratio by parts by weight of the alcoholate to the alkali hydroxide is 1 : 0–10,000, preferably 1 : 0–1,000 and most preferably 1 : 3–50. Preferred alkali hydroxides are sodium and potassium hydroxide. The amount of alkali hydroxide used in the decomposition system is generally 2 mole equivalents per 1 mole equivalent of urethane bonds and/or urea bonds.

More specifically in the case of a flexible foam, semi-rigid foam and elastomer, the alkali hydroxide is added in an amount of about 10 to 35 parts by weight per 100 parts by weight of the foam, and in the case of a rigid foam, the caustic alkali is added in an amount of about 20 to 70 parts by weight per 100 parts by weight of the foam.

The above-stated compounding ratio remains the same when a decomposition accelerator is added to the decomposition reaction system.

The alkali hydroxide is usually added at the time that the decomposition rate of the polyurethane resin decreases or at the time that the addition of the resin is completed.

The decomposition time will vary depending on the decomposition temperature, the amount of the resin, the kind of the resin, the size of the resin, the rate of stirring, the addition of the decomposition accelerator (whether added at the beginning of the decomposition reaction or in the course of thereof), and the like. The decomposition is carried out at a temperature of about 50° to 180° C, preferably about 100° to 160° C, and the decomposition reaction is completed by continuing the stirring for about 1 to 3 hours after the addition of the resin is completed.

In the present invention, the addition of the decomposition accelerator accelerates the dissolution and decomposition of the resin. The term "acceleration of decomposition" designates the effect that carbamate is converted into carbamic acid amide with a compound containing a primary or secondary amine, and the term "acceleration of dissolution" designates a permeating effect which enlarges the contact area between the resin and the decomposition agent (so that the decomposition agent penetrates into the mass of the resin to increase or enlarge the contact area between the resin and the decomposition agent whereby the polyurethane foam swells and easily dissolves) or the effect of reducing the viscosity of the decomposed solution itself.

As these additives, straight or branched chain aliphatic amines, alicyclic amines, heterocyclic amines, and aromatic amines, etc., can be used.

Suitable examples of straight chain aliphatic amines are ethylenediamine, diethylenetriamine, triethylenetetraamine, tetraethylenepentaamine, monopropylamine, dipropylamine, monobutylamine, dibutylamine, octylamine, laurylamine, triethylamine, tetramethylenediamine, hexamethylenediamine, monoethanolamine, diethanolamine, triethanolamine, and the like. Of these compounds, commercially preferred amines are etylenediamine, diethylenetriamine, monoethanolamine, and the like.

Those amines containing an alkyl group as the side chain are isopropylamine, isobutylamine, diisobutylamine, and the like.

Suitable alicyclic amines are cyclohexylamine, dicyclohexylamine, cyclopentylamine, bisaminomethyl cyclohexane, and the like.

Heterocyclic amines include piperazine, aminoethylpiperazine, piperidine, morpholine, N-ethylmorpholine, hexamethylenetetraamine, triethylenediamine, 1,8-diazabiclo(5,4,0)-undecene, pyridine, picoline, imidazole, pyrazol, triazole, tetrazole, and the like.

Aromatic amines are aniline, phenylenediamine, dimethylaniline, monomethylaniline, toluidine, anisidine, diphenylamine, benzidine, phenetidine, tolidine, benzylamine, xylylenediamine, tolylenediamine, diphenylmethane-4,4'-diamine, and the like.

Of these amines, the aliphatic amines are commercially preferred; in particular, alkanolamines and ethyleneamines are commercially preferred since they are low in cost and excellent in permeability into the polyurethane.

In addition, those compounds produced by adding partly an alkylene oxide to these amines or those compounds produced by cyanoethylating these amines can be effectively used in the present invention. Acrylonitrile can be employed in this embodiment; cyanoethylation is conducted using acrylonitrile at 20°-50° C so that at least one active hydrogen atom of the amine remains free.

Partial addition of the alkylene oxide to the amine is carried out in the absence of any catalyst at atmospheric pressure or at an elevated pressure. The number of moles of the alkylene oxide to be added is less by at least one than the number of moles of active hydrogen of the amine, so that a part of the active hydrogens of the amine remain, with preferably 1 - 2 moles of alkylene oxide being employed per mole of the amine. Thus, those compounds wherein at least one mole of the active hydrogen of the amine remains unreacted and each of the other active hydrogens is reacted with one mole of the alkylene oxide are used in the present invention.

As the reagent of the present invention, those consisting of a single amine and a single alkylene oxide are usually employed. To further increase dissolution effects, those in which two or more kinds of amines are employed together and the number of moles of the alkylene oxide added are different can be used. For example, a combination of dimethylethanolamine and aminoethylethanolamine, etc., can be used.

Examples of cyanoethylated compounds of the above amines are monocyanoethylenediamine, dicyanoethylethylenediamine, tetracyanoethylethylenediamine, monocyanoethyldiethylenetriamine, and the like.

As amide bond-containing compounds, formamide, dimethylformamide, diethylformamide, dimethylacetoamide, diethylacetoamide, hexamethylphosphoryltriamide (hereinafter referred to as HMPA), and the like can be used.

As urea bond-containing compounds, urea, methylurea, dimethylurea, diphenylurea, tetramethylurea, and the like can be used.

Preferred materials are dimethylacetamide, tetramethylurea and hexaphosphoryltriamide.

The use of (A) the alcoholate alone that is obtained by alcoholating a part of hydroxyl groups of an alcohol, or an adduct of the alcohol or amine and an alkylene oxide, with an alkali metal as described above, (B) the alcoholate and an alkali hydroxide, (C) the alcoholate of (A) in combination with a decomposition accelerator, or (D) the alcoholate of (B) in combination with a decomposition accelerator, brings about decreased decomposition temperatures by about 10° - 110° C as compared with conventional decomposition methods.

In the case of a rigid foam, the decomposition temperature is 190° - 230° C with conventional methods, while it can be lowered to 90° - 120° C with methods (A) and (B) above and 95° - 140° C with methods (C) and (D) above.

In the case of the flexible foams, semi-rigid foams and elastomers, the decomposition temperature is 140° - 200° C. On the other hand, it can be decreased to 90° - 120° C with methods (A) and (B) above, and to 50° - 120° C with methods of (C) and (D) above.

Thus, in accordance with the present invention it is possible to effect the decomposition of a polyurethane foam at a temperature of 50° - 180° C, preferably 100° - 160° C, which is considerably lower than that attained according to the conventional methods.

With respect to the compounding ratios of the alcoholate to the alkali hydroxide and of the polyurethane resin to the alkali hydroxide, respectively, the foregoing values apply.

The compounding ratio of the alcoholate to the decomposition accelerator is 100 to 5 : 0-95, preferably 80-10 : 20-90, and most preferably 65-15 : 35-85 (all by weight).

By the use of 100 parts of the decomposition reagent, an amount of urethane foam several times as much as the amount of the decomposition reagent can be decomposed, e.g., 1-10 times by weight, preferably 2-5 times by weight.

It is believed that the decomposition of the polyurethane foam in the present invention proceeds as follows:

In the case of a rigid foam or elastomer, equation (1) alone occurs, and in the case of flexible or semirigid foam, equations (1) and (2) occur.

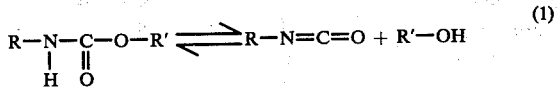

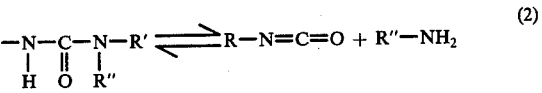

Furthermore, with the use of decomposition accelerators, equation (3) occurs (decomposition of urethane bonding), and with the use of an alkali hydroxide, the decomposition proceeds according to the equation (4).

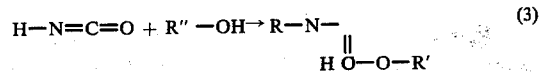

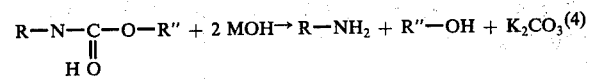

In case where there is present an amine prior to the decomposition, equation (5) takes place (dissociation of urea bonding), and with an alkali hydroxide, the decomposition proceeds according to the equation (6).

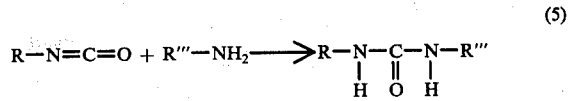

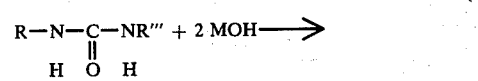

-continued
R—NH$_2$ + R'''—NH$_2$ + M$_2$CO$_3$

In the above equations, R, R', R'', and R''' are aliphatic or aromatic hydrocarbon groups, R''NH$_2$ is an aliphatic, heterocyclic, or aromatic amine, R'''—OH is the alcohol portion of the decomposition accelerator, and M is an alkali metal.

A flexible foam is a foam capable of immediately recovering its original shape after applying pressure thereto, a semi-rigid foam is a foam capable of recovering its original shape with the passage lapse of time after applying pressure thereto, a rigid foam is a foam incapable of recovering its original shape after applying pressure and an elastomer is a solid containing no air bubbles therein.

The various additives of the present invention, amides, cyanoethylated compounds and urea based compounds increase the permeability of the polyurethane foam and reduce in viscosity of the decomposition system, but take little part in the decomposition reaction.

By way of the above reactions, the foam decomposes, whereby a brown to dark brown viscous liquid is obtained. Usual ingredients of the liquid, depending on the decomposition system used, are the starting material, alcoholate, amine compound, decomposition reagent, alkali carbonate and the like. The alcoholate and amine components can be separated by distillation this liquid, for example, at 20°–200° C and 4 mmHg only amines are distilled out. Furthermore, addition-polymerization of an alkylene oxide to these decomposed components (mixture of polyether and amine) followed by purification with water-washing, activated clay or the like enables one to recover these components as starting materials for the production of polyurethane foams. For example, to the decomposate after purification thereof, an alkylene oxide can further added at 100°– 140° C. After removing carbonates by the use of water-washing as typical technique for separation and purification, the resulting ingredients can be re-used as the starting materials.

As described above, the present invention provides providing a useful method for disposal of waste polyurethane foams.

The present invention will be described in detail by reference to the following examples.

PREPARATION EXAMPLES

Polyurethane resins and dissolution solutions used in Examples were prepared as follows.

(1) Preparation of Polyurethane Resin

| | |
|---|---|
| Flexible Foam (units: parts by weight) | |
| Glycerin-Propylene Oxide Adduct (1 : 50 (molar ratio); molecular weight: 3,000) | 100.0 |
| Silicone Oil (SH-190, produced by Toray Silicone Co.) | 1.0 |
| Water | 4.0 |
| Trichloromonofluoromethane (Freon-11, produced by Du Pont Co.) | 5.0 |
| Triethylenediamine | 0.08 |
| Stannous Octoate | 0.35 |
| Tolylenediisocyanate (2,4-isomer/ 2,6-isomer=80/20 by weight) | 50.2 |
| Semi-rigid Foam (units: parts by weight) | |
| Glycerin-Propylene Oxide Adduct (1 : 85 (molar ratio); molecular weight 5,000) | 100.0 |
| Triethanolamine | 5.0 |
| Water | 2.0 |
| Triethylamine | 1.0 |
| Diphenylmethane Diisocyanate (Milionate MR, produced by Nippon Polyurethane Co.) | 52.2 |
| Rigid Foam (units: parts by weight) | |
| Sorbitol-Propylene Oxide Adduct (1 : 8 (molar ratio); molecular weight: 650) | 100.0 |
| Silicone Oil (SH-193, produced by Toray Silicone Co.) | 1.0 |
| Triethylenediamine | 0.5 |
| Trichloromonofluoromethane (the same as above) | 30.0 |
| Diphenylmethanediisocyanate (the same as above) | 126.0 |
| Elastomer (units: parts by weight) | |
| Propylene glycol-Propylene Oxide Adduct (1 : 16 (molar ratio); molecular weight: 1,000)-TDI-80 Prepolymer (NCO content 4%) | 100.0 |
| 4,4-Methylene-bis-2-chloroaniline | 11.0 |

The thus obtained foams were ground to a size of e.g. 5 mm × 5 mm × 5 mm, and used in the following examples. For ease of decomposition, the foams are usually pulverized foams obtained by the use of a pulverizer. There is no limitation with respect to the shape of foams, however.

2. Preparation of Alcoholate

Those polyols shown in Table 1 were used in preparing alcoholates.

Table 1

| | Starting Material | | Addition Material* | | | Molecular Weight |
|---|---|---|---|---|---|---|
| A | Propylene glycol | 1 mol | Propylene oxide | 3.3 | mol | 250 |
| B | Glycerin | 1 mol | '' | 5.0 | mol | 350 |
| C | Glycerin | 1 mol | '' | 50.0 | mol | 3,000 |
| D | Sorbitol | 1 mol | '' | 10.2 | mol | 650 |
| E | Ethylenediamine | 1 mol | '' | 4.0 | mol | 290 |
| F | Methaxylenediamine | 1 mol | '' | 5.3 | mol | 366 |
| G | Propylene glycol | 1 mol | '' | 33.5 | mol | 2,000 |
| H | Glycerin | 1 mol | '' | 0.58 | mol | 92 |

*Addition material is added to 1 mole of starting material to give rise to a product having the molecular weight shown in Table 1.

Sodium hydroxide was blended with these compounds in solid form in a predetermined amount (0.05 – 1%. by weight (catalytic amount)), and the compounds dehydrated at a temperature of 100 to 120° C under reduced pressure (10 mmHg) for 2 hours to produce the alcoholates thereof. The products appeared more viscous than the starting materials.

3. Apparatus and Conditions

In Examples 1 to 9, certain amounts of polyurethane foams were decomposed, and in Examples 10 to 11, the decomposition amount of the foams was increased by the simultaneous use of an alkali hydroxide.

In Examples 1 to 9: Into a 500 ml, four-neck flask equipped with a stirrer, a reflux condenser, and a thermometer were introduced 100 g of the decomposition reagents under the conditions shown in Tables 3 to 13, and then 50 g of the ground polyurethane foam added while heating to increase the temperature of the reaction system at a rate of 5° C per minute from room temperature.

Atmospheric pressure was used. The results shown in Examples 1 to 9 were obtained.

In Tables 3 to 11, each of the columns has the following meaning.

1. Kind of polyol shown in Table 1 used in preparing the alcoholate.
2. Kind of alkali used in preparing the alcoholate.
3. Amount of alkali used in preparing the alcoholate and the number of moles of the alkali per OH equivalent.
4. Kind of the amine used as decomposition accelerator.
5. % by weight of the amine used time based on the weight of the dissolution solution (whole system).
6. Temperature at the start of the decomposition.
7. Temperature at which the decomposition time is measured.
8. Decomposition time.
9. Kind of the foam decomposed.

In Examples 2 and 10 to 11: Into a 1 liter, four neck flask equipped with a stirrer, reflux condenser, and thermometer was introduced 100 g of the decomposition composition prepared under the conditions shown in Tables 4 and 12 to 13. The results shown in Examples 10 to 11 were obtained.

In Tables 12 to 13, each of the columns has the following meaning.

1 to 9: The same as above.
10. Kind of hydroxide used.
11. Amount of the hydroxide added.
12. Total amount of polyurethane foam added.

4. Preparation of Amine Adduct

Amine-propylene oxide adducts produced under the following conditions were used.

Table 2

| Starting Material* | Propylene Oxide | State |
|---|---|---|
| (a) Ethylenediamine | 1 mole | Colorless Liquid |
| (b) Ethylenediamine | 2 mole | White Solid |
| (c) Ethylenediamine | 3 mole | Colorless Liquid |
| (d) Isobutylamine | 1 mole | " |
| (e) Ethanolamine | 1 mole | " |
| (f) Laurylamine | 1 mole | " |
| (g) Aniline | 1 mole | " |
| (h) Butylamine | 1 mole | " |
| (i) Ethylenediamine | Ethylene Oxide 1 mole | " |
| (j) Ethylenediamine | Butylene Oxide 1 mole | " |

*1 mole of amine used.

These starting materials were reacted in the absence of a catalyst at a temperature of 110° to 130° C, under a pressure of 1 to 3 Kg/cm² in an autoclave and for 1 to 5 hours.

EXAMPLE 1

Using the above described experimental apparatus and conditions, the concentrations of the alcoholate and alkali metal in the decomposition solution were changed. The results obtained are shown in Table 3.

As is apparent from the results shown in Table 3, the addition of propylene glycol (molecular weight: 250), glycerin-propylene oxide adduct (molecular weight: 350), or ethylene-diamine-propylene oxide adduct (molecular weight: 290) enables decomposition at low temperatures.

0.05 to 0.1 moles of alkali metal of per OH equivalent gave good results. With the method of the present invention, the decomposition temperature was decreased by about 50° C in the case of rigid foams, and by about 100° C in the case of flexible foams, as compared to conventional methods.

TABLE 3

| Run No. | 1 | 2 | 3 | 4 | 5 | 6 (°C) | 7 (°C) | 8 (hrs. min.) | 9 |
|---|---|---|---|---|---|---|---|---|---|
| 1 | A | — | — | | | 195 | 220 | 2.40 | Flexible |
| 2 | A | K | 0.1 | | | 95 | 120 | 2.15 | — |
| 3 | G | — | — | | | 225 | 240 | 4.00 | " |
| 4 | G | K | 0.1 | | | 160 | 200 | 3.40 | " |
| 5 | H | K | 0.07 | | | 200 | 240 | 2.30 | " |
| 6 | B | — | — | | | 205 | 220 | 2.15 | " |
| 7 | B | K | 0.07 | | | 110 | 140 | 2.30 | " |
| 8 | B | K | 0.20 | | | 125 | 150 | 2.50 | " |
| 9 | B | Na | 0.07 | | | 120 | 140 | 2.40 | " |
| 10* | B | K | 0.07 | | | 120 | 140 | 1.30 | " |
| 11 | C | — | — | | | 225 | 240 | 4.10 | " |
| 12 | C | K | 0.07 | | | 170 | 200 | 3.50 | " |
| 13 | D | K | 0.03 | | | 160 | 200 | 4.00 | " |
| 14 | E | K | 0.05 | | | 110 | 130 | 2.40 | " |
| 15 | B | — | — | | | 200 | 220 | 2.30 | Semirigid |
| 16 | B | K | 0.07 | | | 100 | 120 | 3.00 | " |
| 17 | A | — | — | | | 225 | 240 | 8.00 | Rigid |
| 18 | A | K | 0.1 | | | 170 | 200 | 5.00 | " |
| 19 | A | — | — | | | 235 | 250 | 10.00 | " |
| 20 | B | K | 0.07 | | | 185 | 220 | 7.00 | " |

*In Run No. 10, 4.7 g of KOH was added.

EXAMPLE 2

In this example, the alcoholate was used in combination with the potassium hydroxide, using the above-described experimental apparatus and conditions. The results obtained are shown in Table 4.

TABLE 4

| Run No. | 1 | 2 | 3 | 4 | 5 | 6 (°C) | 7 (°C) | 8 (hrs) | 9 | 10 | 11 (g) | 12 (g) |
|---|---|---|---|---|---|---|---|---|---|---|---|---|
| 21 | B | K | 0.07 | | | 110 | 130 | 5 | Flexible | KOH | 30 | 100 |
| 22* | B | K | 0.07 | | | 110 | 130 | 9 | " | KOH | 60 | 200 |

*In Run No. 22, after completion of the procedure shown in Run No. 21, KOH was further added to the decomposition reaction system to decompose another 100 g of polyurethane resin.

As apparent from the results shown in Table 4, it was possible to decompose the polyurethane foam in large amounts by adding KOH.

EXAMPLE 3

This example was carried out in order to find the most suitable decomposition ratio in the case where an aliphatic amine is used as a decomposition accelerator. That is, using the above-described experimental apparatus and conditions, the ratio of the alcoholate to the amine in the decomposition solution was changed. The results obtained are shown in Table 5. All of the decomposed solutions were brown liquids.

TABLE 5

| Run No. | 1 | 2 | 3 | 4 | 5 (%) | 6 (°C) | 7 (°C) | 8 (hrs) | 9 |
|---|---|---|---|---|---|---|---|---|---|
| 20 | B | K | 0.07 | — | 0 | 185 | 220 | 7.0 | Rigid |
| 23 | " | " | " | Diethylenetriamine | 20 | 137 | 155 | 3.0 | " |
| 24 | " | " | " | " | 50 | 117 | 135 | 3.0 | " |
| 25 | " | " | " | " | 80 | 104 | 125 | 3.0 | " |
| 26 | — | — | — | " | 100 | 133 | 155 | 5.5 | " |

As is apparent from the results shown in Table 5, the use of the alcoholate enables one to carry out the decomposition at a decomposition temperature which is 30° to 80° C lower than that in the case of using the amine alone, and it was confirmed that the decomposition temperature was minimal when the proportion of the amine was at a certain value (in this case, 80%).

EXAMPLE 4

The following examples were conducted in order to observe any synergistic effects when other amines were used in place of diethylenetriamine. That is, in place of the diethylenetriamine used in Example 3, branched chain aliphatic amines, aromatic amines, alicyclic amines, heterocyclic amines, and the like were used. The results obtained are shown in Table 6.

perature by 20° to 60° C, and thus it was confirmed that these amines are also effective.

EXAMPLE 5

In this example, the concentration of the alcoholate was changed in order to observe the synergism of the alcoholate and decomposition agents. That is, in accordance with the method described in the Preparation Example, the concentration of potassium of the alcoholate at the time of adding each decomposition agent was changed, and the temperature at which the foam begins to dissolve and dissolution rate were measured. The results obtained are shown in Table 7.

TABLE 7

| Run No. | 1 | 2 | 3 (mol) | 4 | 5 (%) | 6 (° C) | 7 (° C) | 8 (hr) | 9 |
|---|---|---|---|---|---|---|---|---|---|
| 41 | B | K | 0.01 | Diethylenetriamine | 50 | 145 | 165 | 5 | Rigid |
| 42 | " | " | 0.05 | " | 50 | 114 | 135 | 4.5 | " |
| 43 | " | " | 0.1 | " | 50 | 124 | 145 | 3 | " |
| 44 | " | " | 0.5 | " | 50 | 135 | 155 | 3.5 | " |
| 45 | B | K | 0.01 | Diisobutylamine | 50 | 120 | 140 | 3.5 | " |
| 46 | " | " | 0.03 | " | " | 110 | 130 | 3.5 | " |
| 47 | " | " | 0.05 | " | " | 110 | 130 | 3.0 | " |
| 48 | " | " | 0.1 | " | " | 105 | 128 | 3.0 | " |
| 49 | " | " | 0.3 | " | " | 105 | 125 | 2.5 | " |
| 50 | " | " | 0.5 | " | " | 105 | 130 | 2.5 | " |
| 51 | " | " | 1.0 | " | " | 110 | 140 | 3.0 | " |
| 52 | B | K | 0.01 | HMPA* | 50 | 125 | 145 | 3.5 | " |
| 53 | " | " | 0.03 | HMPA* | " | 120 | 140 | 3.0 | " |
| 54 | " | " | 0.05 | HMPA* | " | 115 | 135 | 3.0 | " |
| 55 | " | " | 0.1 | HMPA* | " | 110 | 130 | 2.5 | " |
| 56 | " | " | 0.3 | HMPA* | " | 110 | 130 | 2.0 | " |
| 57 | " | " | 0.5 | HMPA* | " | 110 | 130 | 2.0 | " |
| 58 | " | " | 1.0 | HMPA* | " | 115 | 135 | 3.0 | " |
| 59 | " | " | 0.07 | Tetramethylurea | " | 95 | 115 | 2.5 | " |
| 60 | " | " | 0.5 | Tetramethylurea | " | 90 | 110 | 2.0 | " |
| 61 | " | " | 0.07 | Monocyanoethyl-ethylenediamine | " | 90 | 110 | 2.5 | " |
| 62 | B | K | 0.5 | Monocyanoethyl-ethylenediamine | 50 | 85 | 105 | 2.0 | Rigid |
| 63 | " | " | 0.01 | a | " | 133 | 150 | 4.0 | " |
| 64 | " | " | 0.03 | " | " | 125 | 145 | 3.5 | " |
| 65 | " | " | 0.05 | " | " | 120 | 140 | 3.0 | " |
| 66 | " | " | 0.1 | " | " | 115 | 135 | 3.0 | " |
| 67 | " | " | 0.3 | " | " | 115 | 135 | 2.5 | " |
| 68 | " | " | 0.5 | " | " | 115 | 135 | 2.5 | " |
| 69 | " | " | 1.0 | " | " | 120 | 150 | 3.0 | " |

*HMPA hexamethylphosphoryltriamide

From the results shown in Table 7, it can be understood that industrially preferred conditions, i.e., low dissolution temperature and short dissolution time, can

TABLE 6

| Run No. | 1 | 2 | 3 (mol) | 4 | 5 (%) | 6 (° C) | 7 (° C) | 8 (hrs) | 9 |
|---|---|---|---|---|---|---|---|---|---|
| 20 | B | K | 0.07 | — | 0 | 185 | 220 | 7.0 | Rigid |
| 27 | " | " | " | Diisobutylamine | 20 | 115 | 135 | 3.0 | " |
| 28 | " | " | " | " | 50 | 110 | 130 | 3.0 | " |
| 29 | " | " | " | " | 80 | 95 | 115 | 3.0 | " |
| 30 | — | — | — | " | 100 | 135 | 140 | 5.0 | " |
| 31 | B | K | 0.07 | " | 80 | 65 | 85 | 1.0 | Flexible |
| 32 | " | " | " | " | 80 | 85 | 105 | 1.0 | Semirigid |
| 33 | " | " | " | " | 80 | 90 | 110 | 3.5 | Elastomer |
| 34 | B | K | 0.07 | N-Ethylmorpholine | 50 | 128 | 145 | 3.5 | Rigid |
| 35 | " | " | " | Aniline | 50 | 125 | 145 | 3.5 | " |
| 36 | " | " | " | Bisaminomethyl-Cyclohexane | 50 | 127 | 145 | 3.5 | " |
| 37 | " | " | " | Aniline + N-Ethylmorpholine (1:1) | 50 | 120 | 140 | 3.0 | " |
| 38 | — | — | — | N-Ethylmorpholine | 100 | Insoluble | — | — | " |
| 39 | — | — | — | Aniline | 100 | 165 | 180 | 5.0 | " |
| 40 | — | — | — | Bisaminomethyl-Cyclohexane | 100 | 148 | 170 | 5.0 | " |

As is apparent from the results shown in Table 6, as in the case of the straight chain aliphatic amines, the use of branched chain aliphatic amines, alicyclic amines, heterocyclic amines, or aromatic amines in combination with the alcoholate decreases the decomposition tembe attained at an alkali concentration of about 0.03 to 0.7 mols, preferably about 0.07 to 0.5 mols, per mol of OH-containing material as shown in Table 1.

EXAMPLE 6

In this example, the kind of alkali hydroxide was changed in order to observe the effect thereof onto the dissolution of the resin. The results obtained are shown in Table 8.

TABLE 8

| Run No. | 1 | 2 | 3 (mol) | 4 | 5 (%) | 6 (°C) | 7 (°C) | 8 (hr) | 9 |
|---|---|---|---|---|---|---|---|---|---|
| 24 | B | K | 0.07 | Diethylenetriamine | 50 | 117 | 135 | 3.0 | Rigid |
| 70 | " | Li | " | " | " | 135 | 155 | 4 | " |
| 71 | " | Na | " | " | " | 126 | 145 | 3.5 | " |
| 28 | B | K | " | Diisobutylamine | " | 110 | 130 | 3.0 | " |
| 72 | " | Li | " | " | " | 130 | 140 | 4.5 | " |
| 73 | " | Na | " | " | " | 124 | 140 | 3.5 | " |
| 74 | " | K | " | HMPA | 50 | 110 | 130 | 2.5 | " |
| 75 | " | Li | " | HMPA | " | 130 | 150 | 5.0 | " |
| 76 | " | Na | " | HMPA | " | 120 | 140 | 3.0 | " |
| 59 | " | K | " | Tetramethylurea | " | 95 | 115 | 2.5 | " |
| 77 | B | Na | " | " | " | 110 | 130 | 3.0 | " |
| 61 | B | K | " | Monocyanoethyl-ethylenediamine | " | 90 | 110 | 2.5 | " |
| 78 | " | Na | " | " | " | 110 | 130 | 3.0 | " |

As is apparent from the results shown in Table 8, all of Li, Na, and K brought about a synergistic effect, and of these elements, it was confirmed that potassium (K) was most effective to assist dissolution.

EXAMPLE 7

In this example, the polyols used in preparing the alcoholates were changed, and the results obtained are shown in Table 9.

TABLE 9

| Run No. | 1 | 2 | 3 (mol) | 4 | 5 (%) | 6 (°C) | 7 (°C) | 8 (hr) | 9 |
|---|---|---|---|---|---|---|---|---|---|
| 79 | A | K | 0.07 | Diethylenetriamine | 50 | 110 | 130 | 3 | Rigid |
| 24 | B | " | " | " | " | 117 | 135 | 3 | " |
| 80 | C | " | " | " | " | 158 | 180 | 6.5 | " |
| 81 | D | " | " | " | " | 140 | 160 | 4.5 | " |
| 82 | E | " | " | " | " | 123 | 145 | 2.5 | " |
| 83 | F | " | " | " | " | 126 | 145 | 3.5 | " |
| 84 | A | K | 0.07 | Diisobutylamine | 50 | 105 | 125 | 2.5 | " |
| 28 | B | " | " | " | " | 110 | 130 | 3.0 | " |
| 85 | C | " | " | " | " | Impossible to dissolve | | — | " |
| 86 | D | " | " | " | " | 155 | 140 | 5.0 | " |
| 87 | A | K | 0.07 | HMPA | 50 | 105 | 125 | 2.0 | " |
| 74 | B | " | " | HMPA | " | 110 | 130 | 2.5 | " |
| 88 | C | " | " | HMPA | " | Impossible to dissolve | | — | " |
| 89 | D | " | " | HMPA | " | 130 | 145 | 4.5 | " |
| 90 | A | " | " | Tetramethylurea | " | 90 | 110 | 2.0 | " |
| 59 | B | " | " | " | " | 95 | 115 | 2.5 | " |
| 91 | C | " | " | " | " | Impossible to dissolve | | — | " |
| 92 | D | " | " | " | " | 120 | 140 | 4.0 | " |
| 93 | A | " | " | Monocyanoethyl-ethylenediamine | " | 85 | 105 | 2.0 | " |
| 61 | B | K | 0.07 | Monocyanoethyl-ethylenediamine | 50 | 90 | 110 | 2.5 | Rigid |
| 94 | C | " | " | " | " | Impossible to dissolve | | — | " |
| 95 | D | " | " | " | " | 120 | 140 | 4.0 | " |
| 96 | A | K | 0.07 | b | 50 | 110 | 150 | 2.5 | " |
| 97 | B | " | " | " | " | 120 | 140 | 3.0 | " |
| 98 | C | " | " | " | " | 140 | 160 | 6.0 | " |
| 99 | D | " | " | " | " | 140 | 160 | 5.0 | " |
| 100 | E | " | " | " | " | 155 | 175 | 5.0 | " |
| 101 | F | " | " | " | " | 150 | 150 | 5.5 | " |

As is apparent from the results shown in Table 9, it was confirmed that the use of a propylene oxide adduct of glycerin (molecular weight: 350) and a propylene oxide adduct of propylene glycol (molecular weight: 250)enables one to dissolve at a low temperature.

EXAMPLE 8

In the case of flexible foams, variations in dissolution temperature and time according to the kind of the additives were measured, and the results obtained are shown in Table 10.

TABLE 10

| Run No. | 1 | 2 | 3 (mol) | 4 | 5 (%) | 6 (°C) | 7 (°C) | 8 (hr) | 9 |
|---|---|---|---|---|---|---|---|---|---|
| 7 | B | K | 0.07 | — | 0 | 110 | 140 | 2.5 | Flexible |
| 102 | " | " | " | N-Ethylmorpholine | 50 | 87 | 110 | 1 | " |
| 103 | " | " | " | Bisaminomethyl-cyclohexane | " | 83 | 110 | 1 | " |
| 104 | " | " | " | Ethylenediamine | " | 71 | 90 | 2 | " |
| 105 | " | " | " | Ethylenediamine | 80 | 60 | 80 | 1.5 | " |
| 106 | " | " | " | Aniline | 50 | 72 | 90 | 1.5 | " |
| 107 | — | — | — | Aniline | 100 | 180 | 180 | 3.5 | " |

As is apparent from the results shown in Table 10, flexible foams can be decomposed at industrially favorable temperatures by the use of an alcoholate in combination with an amine.

aration Examples was added 0.3 mol of a hydroxide, and the dissolution starting temperature and dissolution rate were measured. The results obtained are shown in Table 12.

TABLE 12

| Run No. | 1 | 2 | 3 (mol) | 4 | 5 (%) | 6 (°C) | 7 (°C) | 8 (hr) | 9 | 10 |
|---|---|---|---|---|---|---|---|---|---|---|
| 116 | B | K | 0.07 | Diethylene-triamine | 50 | | 135 | 1 | Rigid | NaOH |
| 117 | " | " | " | " | " | | " | 0.5 | " | KOH |
| 118 | " | " | " | " | " | | " | 2.5 | " | Ca(OH)$_2$ |
| 119 | B | K | 0.07 | diisobutylamine | 50 | 105 | 130 | 1.0 | " | NaOH |
| 120 | " | " | " | Diisobutylamine | " | 105 | 130 | 0.5 | " | KOH |
| 121 | " | " | " | Diisobutylamine | " | 110 | 140 | 2.5 | " | Ca(OH)$_2$ |
| 122 | " | " | " | HMPA | " | 105 | 125 | 1.0 | " | NaOH |
| 123 | " | " | " | HMPA | " | 100 | 120 | 0.5 | " | KOH |
| 124 | " | " | " | HMPA | " | 110 | 130 | 2.0 | " | Ca(OH)$_2$ |
| 125 | " | " | " | Tetramethyl-urea | " | 90 | 110 | 0.5 | " | KOH |
| 126 | " | " | " | Monocyanoethyl-ethylenediamine | " | 90 | 110 | 0.5 | " | KOH |
| 127 | B | K | 0.07 | a | 50 | 117 | 140 | 1.0 | " | NaOH |
| 128 | " | " | " | " | " | 115 | 140 | 0.5 | " | KOH |
| 129 | " | " | " | " | " | 120 | 140 | 3.0 | " | Ca(OH)$_2$ |

EXAMPLE 9

In the case of semi-rigid foams, variations in dissolution temperature and dissolution rate according to the kind of the decomposition agent were measured, and the results obtained are shown in Table 11.

As is apparent from the results shown in Table 12, the decomposition time can be reduced by the addition of any hydroxide, and it was confirmed that of these hydroxides, the K and Na hydroxides gave preferred results.

TABLE 11

| Run No. | 1 | 2 | 3 (mol) | 4 | 5 (%) | 6 (°C) | 7 (°C) | 8 (hr) | 9 |
|---|---|---|---|---|---|---|---|---|---|
| 16 | B | K | 0.07 | — | 0 | 100 | 120 | 3 | Semirigid |
| 108 | " | " | " | Aniline | 50 | 82 | 100 | 1 | " |
| 109 | " | " | " | Bisaminomethyl-cyclohexane | " | 85 | 100 | 1 | " |
| 110 | " | " | " | N-Ethylmorpholine | " | 85 | 100 | 2 | " |
| 111 | " | " | " | Ethylenediamine | " | 87 | 100 | 0.5 | " |
| 112 | — | — | — | Aniline | 100 | 175 | 180 | 3 | " |
| 113 | — | — | — | Bisaminomethyl-cyclohexane | 100 | 140 | 160 | 0.5 | " |
| 114 | — | — | — | N-Ethylmorpholine | " | Impossible to dissolve | — | | " |
| 115 | — | — | — | Ethylenediamine | " | | — | | " |

As is apparent from the results shown in Table 11, semi-rigid foams can be decomposed at industrially useful temperatures due to the synergistic effect of the alcoholate and amine.

EXAMPLE 10

In addition to 100 g of each of the decomposition solutions prepared by the method described in the Prep-

EXAMPLE 11

In this example, the alcoholate, various decomposition accelerators, and a hydroxide were used at the same time, using the experimental apparatus and conditions heretofore described. The results obtained are shown in Table 13.

TABLE 13

| Run No. | 1 | 2 | 3 | 4 | 5 (%) | 6 (°C) | 7 (°C) | 8 (hr) | 9 | 10 | 11 (g) | 12 (g) |
|---|---|---|---|---|---|---|---|---|---|---|---|---|
| 130 | B | K | 0.07 | Diethylenetriamine | 50 | 117 | 125–130 | 0.33 | Rigid | — | 0 | 20 |
| 131 | " | " | " | " | " | " | " | 3.4 | " | KOH | 55 | 80 |
| 132 | " | " | " | " | " | " | " | 10 | " | " | 115 | 240 |
| 133 | " | " | " | No addition | 0 | " | 180 | 1.5 | " | — | 0 | 20 |
| 134 | — | — | — | Diethylenetriamine | 100 | " | 155 | 0.67 | " | — | 0 | 20 |
| 135 | B | K | 0.07 | Diisobutylamine | 50 | 110 | 130 | 0.25 | " | — | 0 | 20 |
| 136 | " | " | " | " | " | " | " | 3.1 | " | KOH | 55 | 80 |
| 137 | " | " | " | " | " | " | " | 9.1 | " | " | 115 | 240 |
| 138 | " | " | " | No addition | 0 | 185 | 200 | 1.5 | " | — | 0 | 20 |
| 139 | — | — | — | Diisobutylamine | 100 | 135 | 140 | 0.5 | " | — | 0 | 20 |
| 140 | B | K | 0.07 | HMPA | 50 | 110 | 130 | 0.33 | " | — | 0 | 20 |
| 141 | " | " | " | HMPA | " | " | " | 2.8 | " | KOH | 55 | 80 |
| 142 | " | " | " | HMPA | " | " | " | 8.5 | " | " | 115 | 240 |
| 143 | " | " | " | No addition | " | 180 | 200 | 1.5 | " | — | 0 | 20 |
| 144 | " | " | " | Tetramethylurea | " | 95 | 115 | 0.25 | " | — | 0 | 20 |
| 145 | B | K | 0.07 | Tetramethylurea | 50 | 95 | 115 | 2.5 | Rigid | KOH | 55 | 80 |
| 146 | " | " | " | " | " | " | " | 8.0 | " | " | 115 | 240 |
| 147 | " | " | " | Monocyanoethyl-ethylenediamine | " | 90 | 110 | 0.33 | " | — | 0 | 20 |
| 148 | " | " | " | " | " | " | " | 3.0 | " | KOH | 55 | 80 |
| 149 | " | " | " | " | " | " | " | 9.0 | " | " | 115 | 240 |
| 150 | B | K | 0.07 | a | 50 | 120 | 140 | 0.5 | " | — | 0 | 20 |
| 151 | " | " | " | " | " | " | " | 4.0 | " | KOH | 55 | 80 |

TABLE 13-continued

| Run No. | 1 | 2 | 3 | 4 | 5 (%) | 6 (° C) | 7 (° C) | 8 (hr) | 9 | 10 | 11 (g) | 12 (g) |
|---|---|---|---|---|---|---|---|---|---|---|---|---|
| 152 | " | " | " | " | " | " | " | 9.5 | " | " | 115 | 240 |
| 153 | " | " | " | No addition | 0 | 185 | 200 | 1.5 | " | — | 0 | 20 |
| 154 | — | — | — | a | 100 | 145 | 165 | 0.83 | " | — | 0 | 20 |

As is apparent from the results shown in Table 13, when 20 g of the foam was dissolved, the dissolution rate was reduced, but if 55 g of KOH was further added, the foam could be decomposed in an amount up to 80 g. Furthermore, it was confirmed that a large amount of foam could be decomposed if additional KOH was added. It was confirmed that the use of alcoholate and KOH enabled one to reduce the decomposition temperature by about 20° to 65° C as compared with the decomposition temperature attained by the use of alcoholate alone.

While the invention has been described in detail and with reference to specific embodiments thereof, it will be apparent to one skilled in the art that various changes and modifications can be made therein without departing from the spirit and scope thereof.

What is claimed is:

1. A process for decomposing a polyurethane resin foam produced from polyetherpolyol and polyisocyanate which comprises heating said polyurethane resin in the presence of:
   1. an alcoholate alone, said alcoholate being produced by alcoholating a part of the OH groups of an alcohol, or a part of the OH groups of an alkylene oxide adduct of an alcohol, or amine, with an alkali metal;
   2. said alcoholate and an alkali hydroxide; or
   3. a combination of said alcoholate, or said alcoholate and alkali hydroxide, and a decomposition accelerator selected from the group consisting of:
      a. one or more selected from straight aliphatic amines, branched aliphatic amines, alicyclic amines, heterocyclic amines, and aromatic amines;
      b. one or more of those compounds produced by cyanoethylating said amines or by the partial addition an alkylene oxide to said amines; and
      c. one or more of amides and urea based compounds.

2. The process according to claim 1, wherein the alcoholate is produced by alcoholating an alcohol selected from the group consisting of dihydric alcohols, trihydric alcohols, tetrahydric alcohols, and hexahydric alcohols, and having an OH equivalent of about 30 to 1,000 with an alkali metal in an amount of about 0.0001 to 0.5 mol per OH equivalent.

3. The process according to claim 1, wherein the alcoholate is produced by alcoholating an adduct produced by adding ethylene oxide, propylene oxide, or a mixture thereof to an alcohol selected from the group consisting of dihydric alcohols, trihydric alcohols, tetrahydric alcohols, and hexahydric alcohols, and having an OH equivalent of about 30 to 1,000 with an alkali metal in an amount of about 0.001 to 0.5 mol per OH equivalent.

4. The process according to claim 1, wherein the alcoholate is produced by alcoholating an alkylene oxide adduct produced by adding ethylene oxide, propylene oxide, or a mixture thereof to an aromatic or aliphatic amine, and having an OH equivalent of about 30 to 1,000 with an alkali metal in an amount of about 0.0001 to 0.5 mol per OH equivalent.

5. The process according to claim 3, wherein ethylene oxide, propylene oxide or a mixture thereof is added to an alcohol selected from the group consisting of ethylene glycol, glycerin, diethylene glycol, dipropylene glycol, trimethylolpropane, propylene glycol, and sorbitol.

6. The process according to claim 4, wherein propylene oxide is added to an amine selected from the group consisting of ethylenediamine and methaxylylenediamine.

7. The process according to claim 1, wherein one or more straight aliphatic amines selected from the group consisting of ethylenediamine, diethylenetriamine, monoethanolamine, diethanolamine, and triethanolamine are used as the decomposition accelerator.

8. The process according to claim 1, wherein one or more branched aliphatic amines selected from the group consisting of isopropylamine, isopropanolamine, and isobutanolamine are used as the decomposition accelerator.

9. The process according to claim 1, wherein one or more alicyclic amines selected from the group consisting of cyclohexylamine and bisaminomethylcyclohexane are used as the decomposition accelerator.

10. The process according to claim 1, wherein one or more heterocyclic amines selected from the group consisting of piperazine, aminoethylpiperazine, morpholine, N-ethylmorpholine, pyridine, and picoline are used as the decomposition accelerator.

11. The process according to claim 1, wherein one or more aromatic amines selected from the group consisting of aniline, phenylenediamine, benzylamine, m-xylylenediamine, tolylenediamine, and diphenylmethane-4,4'-diamine are used as the decomposition accelerator.

12. The process according to claim 1, wherein a cyanoethylated compound of a straight or branched aliphatic amine, alicyclic amine, heterocyclic amine, or aromatic amine is used as the decomposition accelerator.

13. The process according to claim 1, wherein one or more cyanoethylated compound of a straight aliphatic amine selected from the group consisting of monocyanoethylethylenediamine, dicyanoethylenediamine, monocyanoethyldiethylenetriamine, dicyanoethyldiethylenetriamine, and monocyanoethylethanolamine are used as the decomposition accelerator.

14. The process according to claim 1, wherein one or more adduct compounds selected from those compounds produced by adding partly an alkylene oxide to the active hydrogens of a straight aliphatic amine, branched aliphatic amine, alicyclic amine, heterocyclic amine, or aromatic amine are used as the decomposition accelerator.

15. The process according to claim 1, wherein one or more alkylene oxide adduct of straight aliphatic amine selected from the group consisting of dimethylethanolamine, aminoethylethanolamine, and aminoethylisopropanolamine are used as the decomposition accelerator.

16. The process according to claim 1, wherein one or more amides are used as the decomposition accelerator.

17. The process according to claim 1, wherein one or more amides selected from the group consisting of dimethylacetamide, dimethylformamide, and hexamethylphosphoryltriamide are used as the decomposition accelerator.

18. The process according to claim 1, wherein tetramethylurea as the urea based compound is used as the decomposition accelerator.

19. The process of claim 1 wherein said polyurethane resin foam is a flexible, semi-rigid or elastomeric foam, and said alkali hydroxide is KOH or NaOH and is added in an amount of from about 10 to 35 parts by weight of said resin foam.

20. The process of claim 1 wherein said polyurethane resin foam is a rigid foam and said alkali hydroxide is KOH or NaOH and is added in an amount of from about 20 to 70 parts by weight of said resin foam.

* * * * *